United States Patent
Breakstone et al.

(10) Patent No.: US 10,467,166 B2
(45) Date of Patent: *Nov. 5, 2019

(54) STACKED-DEVICE PERIPHERAL STORAGE CARD

(71) Applicant: Liqid Inc., Lafayette, CO (US)

(72) Inventors: Jason Breakstone, Broomfield, CO (US); Andrew Rudolph Heyd, Longmont, CO (US); Christopher R. Long, Colorado Springs, CO (US); James Scott Cannata, Denver, CO (US)

(73) Assignee: Liqid Inc., Broomfield, CO (US)

( * ) Notice: Subject to any disclaimer, the term of this patent is extended or adjusted under 35 U.S.C. 154(b) by 231 days.

This patent is subject to a terminal disclaimer.

(21) Appl. No.: 15/220,740

(22) Filed: Jul. 27, 2016

(65) Prior Publication Data

US 2016/0335220 A1 Nov. 17, 2016

Related U.S. Application Data

(63) Continuation-in-part of application No. 14/694,578, filed on Apr. 23, 2015, now Pat. No. 9,678,910.

(Continued)

(51) Int. Cl.
*G06F 13/40* (2006.01)
*G06F 1/18* (2006.01)
*G06F 13/42* (2006.01)

(52) U.S. Cl.
CPC ........ *G06F 13/4022* (2013.01); *G06F 1/185* (2013.01); *G06F 13/4068* (2013.01); *G06F 13/4282* (2013.01)

(58) Field of Classification Search
CPC .............. G06F 13/4221; G06F 3/0617; G06F 13/4022; G06F 13/4068; G06F 13/4282;
(Continued)

(56) References Cited

U.S. PATENT DOCUMENTS 5,828,207 A 10/1998 Saadeh
6,061,750 A 5/2000 Beardsley et al.
(Continued)

OTHER PUBLICATIONS

Juan L. Aragon, et al.; "Control Speculation for Energy-Efficient Next-Generation Superscalar Processors;" IEEE Transactions on Computers; Mar. 2006; pp. 281-291; vol. 55, No. 3; IEEE Computer Society.
(Continued)

*Primary Examiner* — Ernest Unelus

(57) ABSTRACT

Various computer peripheral cards, devices, systems, methods, and software are provided herein. In one example, a storage card insertable into a connector of a host system includes a plurality of M.2 device connectors in a stacked arrangement comprising a first horizontal row of one or more M.2 device connectors positioned vertically higher in the stacked arrangement than a second horizontal row of one or more M.2 device connectors, the plurality of M.2 device connectors each configured to mate with associated M.2 devices. The storage card also includes a Peripheral Component Interconnect Express (PCIe) switch circuit configured to communicatively couple the plurality of M.2 device connectors and a connector of the storage card, wherein the PCIe switch circuit is configured to receive storage operations over the connector of the storage card and transfer the storage operations for delivery to ones of the plurality of M.2 device connectors over associated PCIe interfaces.

20 Claims, 10 Drawing Sheets

Related U.S. Application Data

(60) Provisional application No. 62/198,490, filed on Jul. 29, 2015, provisional application No. 61/984,207, filed on Apr. 25, 2014, provisional application No. 61/984,219, filed on Apr. 25, 2014, provisional application No. 61/984,193, filed on Apr. 25, 2014, provisional application No. 61/984,199, filed on Apr. 25, 2014.

(58) Field of Classification Search
CPC .. G06F 1/182; G06F 2213/0026; G05B 11/01
See application file for complete search history.

(56) References Cited

U.S. PATENT DOCUMENTS

| | | |
|---|---|---|
| 6,325,636 B1 | 12/2001 | Hipp et al. |
| 7,243,145 B1 | 7/2007 | Poortman |
| 7,260,487 B2 | 8/2007 | Brey et al. |
| 7,505,889 B2 | 3/2009 | Salmonsen et al. |
| 7,606,960 B2 | 10/2009 | Munguia |
| 7,725,757 B2 | 5/2010 | Padweka et al. |
| 7,877,542 B2 | 1/2011 | Chow et al. |
| 8,125,919 B1 | 2/2012 | Khanka et al. |
| 8,150,800 B2 | 4/2012 | Webman et al. |
| 8,656,117 B1 | 2/2014 | Wong et al. |
| 8,688,926 B2 | 4/2014 | Breakstone et al. |
| 8,880,771 B2 | 11/2014 | Subramaniyan et al. |
| 9,602,437 B1 | 3/2017 | Bernath |
| 2002/0059428 A1 | 5/2002 | Susai et al. |
| 2003/0110423 A1 | 6/2003 | Helms et al. |
| 2003/0126478 A1 | 7/2003 | Burns et al. |
| 2005/0223136 A1 | 10/2005 | Tanaka |
| 2006/0277206 A1 | 12/2006 | Bailey et al. |
| 2007/0067432 A1 | 3/2007 | Tarui et al. |
| 2008/0034153 A1 | 2/2008 | Lee et al. |
| 2008/0198744 A1 | 8/2008 | Menth |
| 2008/0281938 A1 | 11/2008 | Rai et al. |
| 2009/0006837 A1 | 1/2009 | Rothman et al. |
| 2009/0100280 A1 | 4/2009 | Lindsay |
| 2009/0190427 A1 | 7/2009 | Brittain et al. |
| 2009/0193201 A1 | 7/2009 | Brittain et al. |
| 2009/0193203 A1 | 7/2009 | Brittain et al. |
| 2009/0276551 A1 | 11/2009 | Brown et al. |
| 2010/0088467 A1 | 4/2010 | Lee et al. |
| 2011/0289510 A1 | 11/2011 | Lin et al. |
| 2011/0299317 A1 | 12/2011 | Shaeffer et al. |
| 2011/0320861 A1 | 12/2011 | Bayer et al. |
| 2012/0030544 A1 | 2/2012 | Fisher-Jeffes |
| 2012/0089854 A1 | 4/2012 | Breakstone et al. |
| 2012/0151118 A1 | 6/2012 | Flynn et al. |
| 2012/0166699 A1 | 6/2012 | Kumar et al. |
| 2012/0210163 A1 | 8/2012 | Cho |
| 2012/0317433 A1 | 12/2012 | Ellis et al. |
| 2013/0132643 A1 | 5/2013 | Huang |
| 2013/0185416 A1 | 7/2013 | Larkin et al. |
| 2014/0047166 A1 | 2/2014 | Asnaashari et al. |
| 2014/0056319 A1 | 2/2014 | Hellwig |
| 2014/0059265 A1 | 2/2014 | Iyer et al. |
| 2014/0075235 A1 | 3/2014 | Chandhoke et al. |
| 2014/0103955 A1 | 4/2014 | Avritch et al. |
| 2014/0108846 A1 | 4/2014 | Berke et al. |
| 2014/0365714 A1 | 12/2014 | Sweere et al. |
| 2015/0074322 A1 | 3/2015 | Galles |
| 2015/0121115 A1 | 4/2015 | Chandra et al. |
| 2015/0186437 A1 | 7/2015 | Molaro |
| 2015/0212755 A1 | 7/2015 | Asnaashari |
| 2015/0304423 A1 | 10/2015 | Satoyama et al. |
| 2015/0373115 A1 | 12/2015 | Breakstone et al. |
| 2016/0197996 A1 | 7/2016 | Barton et al. |
| 2016/0248631 A1 | 8/2016 | Duchesneau |

OTHER PUBLICATIONS

International Application No. PCT/US2017/046602, International Search Report & Written Opinion, 8 pages, dated Oct. 19, 2017.
International Application No. PCT/US2017/046607, International Search Report & Written Opinion, 7 pages, dated Oct. 23, 2017.
Lu, Yingping et al., "Performance Study of iSCSI-Based Storage Subsystems," IEEE Communications Magazine, pp. 76-82, Aug. 2003.

STACKED-DEVICE PERIPHERAL STORAGE CARD

RELATED APPLICATIONS

This application hereby claims the benefit of and priority to U.S. Provisional Patent Application 62/198,490, titled "ENHANCED PCIe STORAGE CARD," filed Jul. 29, 2015, which is hereby incorporated by reference in its entirety. This application is related to, is a continuation-in-part of, and claims priority to U.S. patent application Ser. No. 14/694,578, titled "POWER HANDLING IN A SCALABLE STORAGE SYSTEM," filed Apr. 23, 2015, which further claims the benefit of and priority to U.S. Provisional Patent Application 61/984,193, titled "SCALABLE STORAGE SYSTEM SLED ARCHITECTURE," filed Apr. 25, 2014, U.S. Provisional Patent Application 61/984,199, titled "SCALABLE STORAGE SYSTEM POWER DOWN HANDLING," filed Apr. 25, 2014, U.S. Provisional Patent Application 61/984,207, titled "SCALABLE STORAGE SYSTEM ARCHITECTURE WITH POWER REDISTRIBUTION," filed Apr. 25, 2014, and U.S. Provisional Patent Application 61/984,219, titled "SCALABLE STORAGE SYSTEM ARCHITECTURE AND STATISTICAL POWER HANDLING," filed Apr. 25, 2014, which are hereby incorporated by reference in their entirety.

BACKGROUND

Computer systems typically include bulk storage systems, such as magnetic disk drives, optical storage devices, tape drives, or solid state storage drives, among other storage systems. As storage needs have increased in these computer systems, networked storage systems have been introduced which store large amounts of data in a storage environment physically separate from end user computer devices. These networked storage systems typically provide access to bulk data storage over one or more network interfaces to end users or other external systems. In addition to storage of data, remote computing systems include various processing systems that can provide remote computing resources to end users. These networked storage systems and remote computing systems can be included in high-density installations, such as rack-mounted environments.

However, as the densities of networked storage systems and remote computing systems increase, various physical limitations can be reached. These limitations include density limitations based on the underlying storage technology, such as in the example of large arrays of rotating magnetic media storage systems. These limitations can also include computing density limitations based on the various physical space requirements for network interconnect as well as the large space requirements for environmental climate control systems.

In addition to physical space limitations, these bulk storage systems have been traditionally limited in the number of devices that can be included per host, which can be problematic in storage environments where higher capacity, redundancy, and reliability is desired. These shortcomings can be especially pronounced with the increasing data storage and retrieval needs in networked, cloud, and enterprise environments.

OVERVIEW

Various computer peripheral cards, devices, systems, methods, and software are provided herein. In one example, a storage card insertable into a connector of a host system includes a plurality of M.2 device connectors in a stacked arrangement comprising a first horizontal row of one or more M.2 device connectors positioned vertically higher in the stacked arrangement than a second horizontal row of one or more M.2 device connectors, the plurality of M.2 device connectors each configured to mate with associated M.2 devices. The storage card also includes a Peripheral Component Interconnect Express (PCIe) switch circuit configured to communicatively couple the plurality of M.2 device connectors and a connector of the storage card, wherein the PCIe switch circuit is configured to receive storage operations over the connector of the storage card and transfer the storage operations for delivery to ones of the plurality of M.2 device connectors over associated PCIe interfaces.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1A:
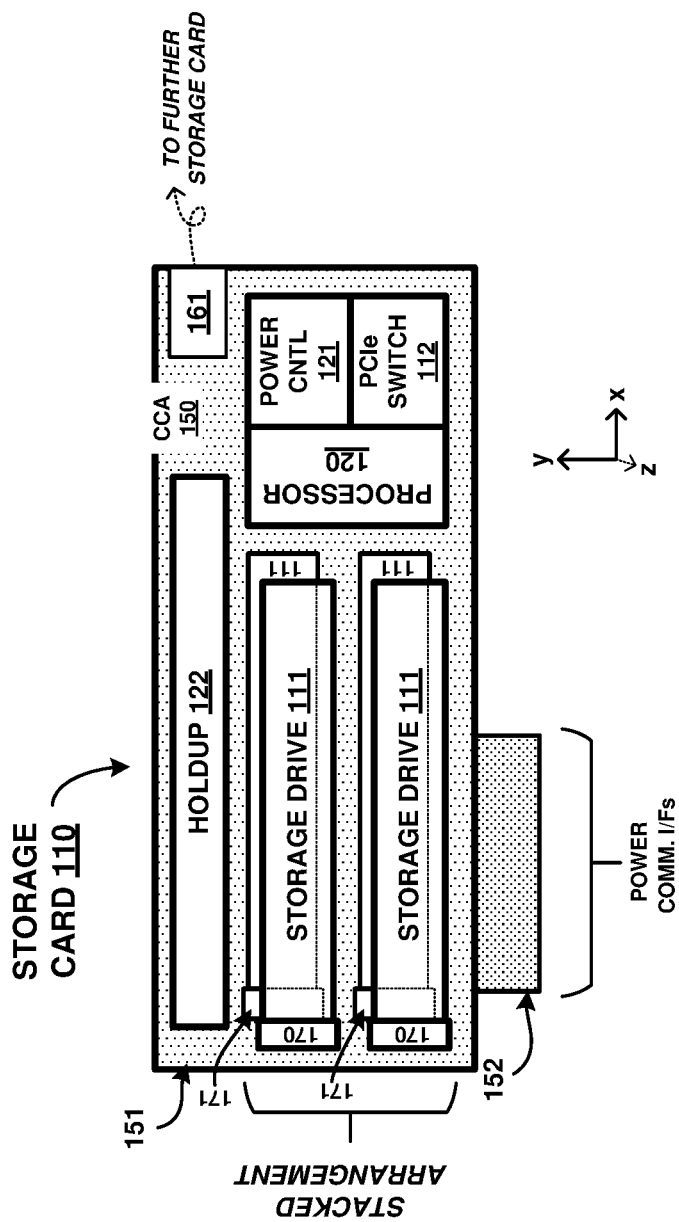
FIG. 1A is a diagram illustrating an example physical configuration of a storage module.
Figure 1B:
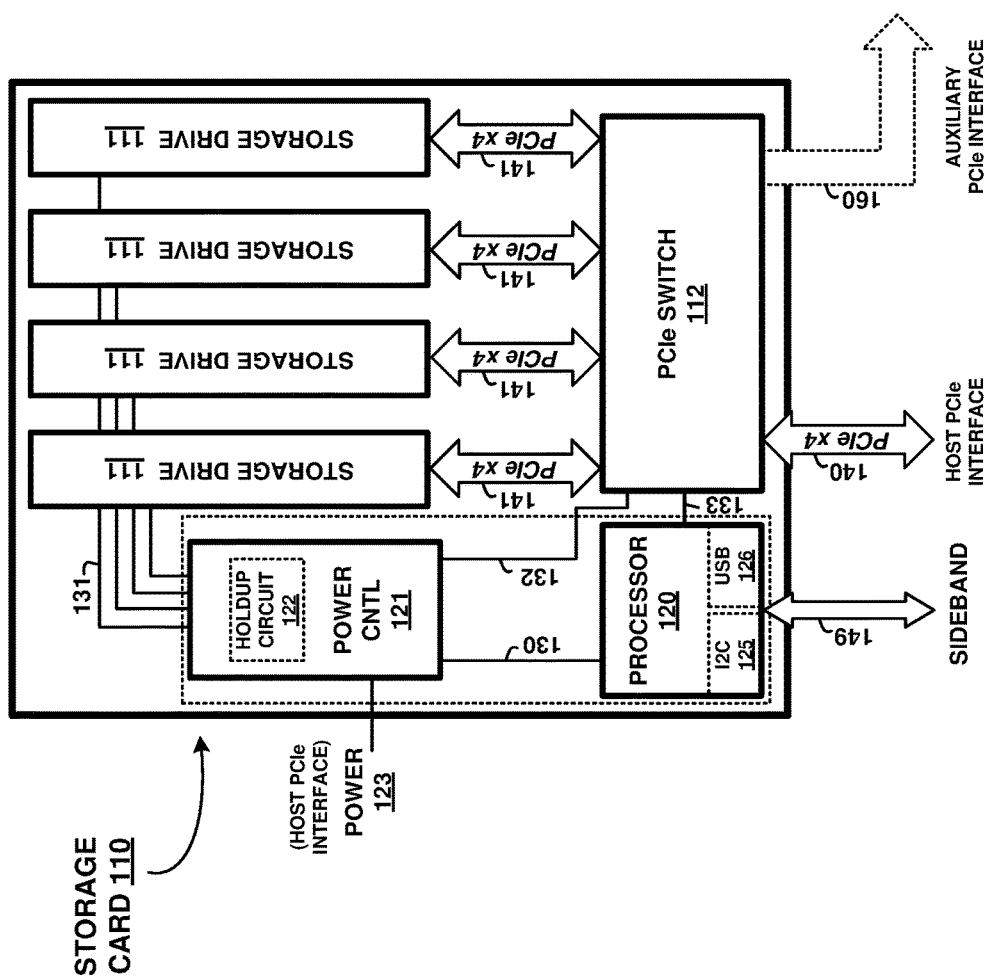
FIG. 1B is a diagram illustrating an example schematic configuration of a storage module.

FIGS. 1A and 1B illustrate a system diagrams of storage card 110. FIG. 1A illustrates an example physical configuration of storage card 110 as shown for circuit card assembly 150. FIG. 1B illustrates an example schematic configuration of storage card 110. Storage card 110 includes four storage drives 111, PCIe switch 112, processor 120, power control module 121, and holdup circuit 122. Power control module 121 distributes power to each element of storage card 110 over associated power links 130-132. Power control module 121 can selectively enable/disable power for each power link. Further communication links can be included for intra-card communication between the various elements of storage card 110.

Storage card 110 includes one or more storage drives 111, such as four each shown in FIGS. 1A and 1B. Storage drives 111 are arranged in a stacked configuration, with a first row or rank of storage drives overlapping with a second row or rank of storage drives. In many examples, two connector heights are employed. A first connector height is employed for the 'lower' rank of storage drives, while a second connector height is employed for the 'upper' rank of storage drives. In FIG. 1A, a 'z' axis comprises a vertical axis oriented out of the drawing, and thus the stacked arrangement is provided in the 'z' direction for ranks of storage drives arranged in the 'y' axis. One or more storage drives can be included in each rank, with associated one or more connectors that couple to the storage drives. The lower rank includes connectors 171, while the upper rank includes connectors 171. As will be discussed in further examples below, connectors 170-171 can comprise M.2 connectors, and each storage drive 111 can comprise M.2 solid state drives (SSD). The connectors couple to the same printed circuit board (PCB) 151 in this example, and the upper rank includes connectors of a height greater than the lower rank. The offset of the upper and lower ranks in the 'y' axis in FIG. 1A is included to emphasize the vertical stacked arrangement in the 'z' axis, and further examples might not include the offset.

Storage card 110 also includes one or more Peripheral Component Interconnect Express (PCIe) switches, processors, and control system elements. PCIe switch 112 communicates with one or more on-card storage drives over associated PCIe links. PCIe switch 112 is also communicatively coupled to an on-card processor or control system for traffic statistics retrieval, power monitoring, status monitoring, among other operations.

PCIe switch 112 communicates with a host system or host module (not pictured) over PCIe link 140. PCIe link 140 can comprise a PCIe link with multiple lanes, such as a "×4" PCIe link, although a different number of PCIe lanes can be employed. Additionally, more than one PCIe link 140 can be employed for load balancing, redundancy, and failover protection for storage card 110. PCIe switch 112 also communicates with four storage drives 111 over associated ×4 PCIe links 141, although a different number of storage drives can be employed. PCIe can support multiple bus widths, such as ×1, ×4, ×8, ×16, and ×32, with each multiple of bus width comprising an additional "lane" for data transfer. PCIe also supports transfer of sideband signaling, such as System Management Bus (SMBus) interfaces and Joint Test Action Group (JTAG) interfaces, as well as associated clocks, power, and bootstrapping, among other signaling.

PCIe interface 140 can carry NVMe (NVM Express) traffic issued by a host processor or host system. NVMe (NVM Express) is an interface standard for mass storage devices, such as hard disk drives and solid state memory devices. NVMe can supplant serial ATA (SATA) interfaces for interfacing with mass storage devices in personal computers and server environments. However, these NVMe interfaces are limited to one-to-one host-drive relationship, similar to SATA devices. In the examples discussed herein, a PCIe interface is employed to transport NVMe traffic and present a multi-drive system as one or more NVMe virtual logical unit numbers (VLUNs) over a PCIe interface.

In NVMe operations, such as an NVMe write operation, data can be received over any of PCIe links 140 or 160 for any storage drive 111. For example, a write operation can be an NVMe write operation received over PCIe link 140 from a device employing an NVMe protocol transported over a PCIe interface. In another example, the write operation can be an NVMe write operation received over PCIe link 140 or 160 from an external device employing an NVMe protocol transported over a PCIe interface. An associated storage drive can receive the NVMe traffic over an associated PCIe interface 141 and respond accordingly, such as with a write confirmation or with read data in the case of an NVMe read operation.

In further examples, processor 120 can handle PCIe traffic for the storage drives and manage the storage drives in a logical manner. For example, data striping can be employed by processor 120 to stripe data for a particular write transaction over any number of storage drives 111, such as over all of the storage drives or a subset of the storage drives. Likewise, data redundancy can be employed to mirror data over any of storage drives 111. In further examples, ones of storage drives 111 are presented as one or more logical drives or logical volumes to a host system, such as one or more NVMe virtual logical units (VLUNs). Processor 120 can manage striping, mirroring, or logical volume establishment and presentation. In a first example, processor 120 receives all PCIe traffic for storage drives 111 over PCIe interface 133 and distributes to appropriate storage drives 111 to achieve striping, mirroring, or logical volumes. In other examples, processor 120 monitors traffic in PCIe switch 112 and instructs PCIe switch 112 to direct PCIe traffic to appropriate storage drives to achieve striping, mirroring, or logical volumes.

As mentioned above, processor 120 can present the storage resources of storage card 110 as a VLUN, such as NVMe VLUNs. Processor 120 can present any number of VLUNs to an external system over a PCIe interface, such as any of PCIe links 140 or 160. These VLUNs can be presented as an NVMe target. An NVMe target can present the storage resources of storage card 110 as a single storage target, such as emulating a single storage drive, over a PCIe interface. In this manner, a plurality of storage drives that comprise any number of storage drives 111 can be presented as a single NVMe target to an external system over a PCIe interface. Processor 120 can receive NVMe storage traffic, such as NVMe frames, and distribute these storage transactions for handling by an assigned storage drive 111. In other examples, processor 120 monitors NVMe storage traffic in PCIe switch 112 and instructs PCIe switch 112 to direct PCIe traffic to appropriate storage drives to achieve VLUNs or NVMe targets.

Auxiliary PCIe interface 160 can optionally be included in storage card 110. Auxiliary PCIe interface 160 can be employed to connect two or more PCIe storage cards to each other for transfer of user data, storage operations, status, control signaling, operational information, or other data between storage cards, such as two of storage card 110. Auxiliary PCIe interface 160 can comprise a different PCIe bus width or lane allocation than host PCIe interface 140. Auxiliary PCIe interface 160 can couple a PCIe interface provided by PCIe switch 112 to a PCIe interface of another storage card which can be included in the same host system as storage card 110 or included in another host system. Additionally, connector 161 can be employed with interface 160 to connect among the various storage cards using associated cabling. In some examples, mini-SAS connectors and cabling are employed and are configured to carry PCIe signaling of auxiliary PCIe interface 160. Auxiliary PCIe interface 160 can also include non-PCIe signaling, such as sideband interfaces 149 or other interfaces.

Auxiliary PCIe interface 160 can be used for cluster interconnect and can terminate at external connectors, such as mini-Serial Attached SCSI (SAS) connectors which are employed to carry PCIe signaling over mini-SAS cabling. In further examples, MiniSAS HD cables are employed that drive 12 Gb/s versus 6 Gb/s of standard SAS cables. 12 Gb/s can support PCIe Gen 3. Connector 161 can comprise mini-SAS connectors that comprise mini-SAS jacks. Associated cabling can comprise SAS cabling which can include associated shielding, wiring, sheathing, and termination connectors.

PCIe switch 112 comprises one or more PCIe crosspoint switches, which logically interconnect various ones of the associated PCIe links based at least on the traffic carried by each PCIe link. PCIe switch 112 establishes switched connections between any PCIe interfaces handled by PCIe switch 112. Each PCIe switch port can comprise a non-transparent (NT) or transparent port. An NT port can allow some logical isolation between endpoints, while a transparent port does not allow logical isolation, and has the effect of connecting endpoints in a purely switched configuration. Access over an NT port or ports can include additional handshaking between the PCIe switch and the initiating endpoint to select a particular NT port or to allow visibility through the NT port. In other examples, a domain-based PCIe signaling distribution can be included which allows segregation of PCIe ports of a PCIe switch according to user-defined groups. In some examples, PCIe switch 112 comprises a PLX Technology PEX8725 10-port, 24 lane PCIe switch chip. In some examples, PCIe switch 112 comprises a PLX Technology PEX8796 24-port, 96 lane PCIe switch chip.

Although PCIe link 140 is used in FIGS. 1A and 1B, it should be understood that additional or different communication links or busses can be employed, such as Ethernet, Serial Attached SCSI (SAS), FibreChannel, Thunderbolt, Serial Attached ATA Express (SATA Express), among other interconnect, network, and link interfaces. Any of the links in FIGS. 1A and 1B can each use various communication media, such as air, space, metal, optical fiber, or some other signal propagation path, including combinations thereof. Any of the PCIe links in FIGS. 1A and 1B can include any number of PCIe links or lane configurations. Any of the links in FIGS. 1A and 1B can each be a direct link or might include various equipment, intermediate components, systems, and networks. Any of the links in FIGS. 1A and 1B can each be a common link, shared link, aggregated link, or may be comprised of discrete, separate links.

Processor 120 can optionally communicate over at least sideband links 149. Sideband links 149 can include Universal Serial Bus (USB), SMBus, JTAG, Inter-Integrated Circuit (I2C), controller area network bus (CAN), or any other communication interface, and in some examples is provided over portions of PCIe link 140. In this example, processor 120 includes I2C interface 125 and USB interface 126 for communication over sideband links 149. I2C interface 125 and USB interface 126 can be included in separate circuitry or included in similar elements as processor 120. Processor 120 and PCIe switch 112 can communicate over an associated communication link 133, which can be an I2C or a PCIe link, among other link types.

Each storage drive 111 comprises a solid state drive (SSD) in this example, and communicates with external systems over an associated PCIe interface included in each storage drive 111. Each storage drive 111 comprises an individual M.2 SSD card, which communicates over an associated PCIe interface 141, which can comprise PCIe interfaces such as described for PCIe interface 140, although variations are possible. The solid state storage media of storage drives 111 can comprise flash memory, static RAM, NAND flash memory, NOR flash memory, memristors, or other solid state media. Instead of or in addition to solid state media, each storage drive 111 can comprise magnetic storage, such as hard disk drives, tape drives, magnetoresistive memory devices, and the like, or can comprise optical storage, such as phase change memory.

Each storage drive 111 can receive read transactions and write transactions issued by a host system, such as a host processor. Responsive to a read transaction, each storage drive 111 can retrieve data identified by the read transaction and transfer the data for delivery to the associated host. Responsive to a write transaction, each storage drive 111 can write data that accompanies the write transaction to storage media associated with storage drive 111. Data striping can be employed by storage card 110 to stripe data for a particular write transaction over any number of storage drives 111.

Each storage drive 111 comprises an M.2 circuit card which is separate from circuit card assembly (CCA) 150 and includes a mini-PCI Express connector or other connector that interfaces with a connector on CCA 150. CCA 150 comprises one or more printed circuit boards 151 that couple to the various elements of storage card 110. In other examples, each storage drive 111 comprises one or more flash memory chips with a PCIe interface which is soldered onto CCA 150. In yet other examples, each storage drive 111 comprises one or more separate solid state disk drives or magnetic hard disk drives along with associated enclosures and circuitry. In the examples shown in FIGS. 8-10, card 110 is shown as an HHHL card (half-height half-length PCIe card). Although card 110 can instead be a FHHL card (full-height half-length PCIe card), FHFL card (full-height full-length PCIe card), or HHFL (half-height full length) in other examples.

Processor 120 comprises one or more microprocessors, processing devices, multi-core processors, processing circuitry, or other processing system. Processor 120 can include one or more non-transitory memory devices, such as RAM, solid state storage, or other memory to store instructions that are executable by processor 120 to operate as discussed herein. In some examples, processor 120 comprises an ARM microcontroller, ARM microprocessor, field-programmable gate array (FPGA), application specific integrated circuit (ASIC), application specific processor, or other microprocessor or processing elements. Processor 120 can comprise any processing elements discussed below for processing system 1100 of FIG. 7. Processor 120 can monitor usage statistics, traffic status, or other usage information through link 133. PCIe switch 112 can track this usage information during normal operation and data transfer with storage drives 111, and processor 120 can retrieve this usage information as needed over link 133.

Holdup circuitry 122 is included on storage card 110 to provide power to the storage card when input power has been lost or removed for the storage card. In some examples, the storage card is removed from an associated mating connector and input power is lost due to the removal. In other examples, power is lost to a host system into which storage card 110 is connected, such as during a facility power outage or when an associated power supply fails.

The various holdup circuitry is also accompanied by a power controller circuit 121 to selectively provide power to the elements of storage card 110. The power controller can receive control instructions from a processor of storage card 110 or from other processors or modules, such as over the Inter-Integrated Circuit (I2C), Ethernet, or Universal Serial Bus (USB) sideband interfaces, or over a PCIe interface. Storage card 110 can receive power over one or more power links as a power source for the various elements of storage card 110, and these power links can be included in a PCIe connector of storage card 110. Holdup circuitry 122 includes energy storage devices for storing power received over the power link for use during power interruption events, such as loss of source power. Holdup circuitry 122 can include capacitance storage devices, such as an array of capacitors. Further discussion of examples of power control circuitry is found below.

Although processor 120 and power controller 121 are shown as separate elements in FIGS. 1A and 1B, it should be understood that processor 120 and power controller 121 can be included in the same processing circuitry. In some examples, processor 120 and power controller 121 comprise an ARM-compatible microprocessor or microcontroller, although other circuitry can be employed, such as found in FIGS. 2 and 7.

Storage card 110 can provide self-power during power interruption events. Typically, storage card 110 will use any associated holdup power to commit in-flight write data associated with pending write operations before power down of circuitry of storage card 110. The in-flight write data can be committed to associated storage drives 111, or can be committed to other non-volatile memory such as a non-volatile write cache which can hold write data until power is restored. Once any in-flight write data has been committed to non-volatile memory, then excess or remaining holdup power can be held for future use, bled off into dummy loads, or redistributed to other cards over PCIe power links or other power links.

In some examples, no pending write operations are present when input power is lost, and a larger amount of excess power is available on storage card 110. This excess power can be redistributed to a different storage card to aid that storage card in commit processes for associated write operations. Advantageously, excess holdup power of one storage card can be used to power operations of another storage card during power interruptions. This redistributed power can be transferred to other storage cards or other PCIe cards over power links included in the PCIe interface connector 152.

Power control module 121 includes circuitry to selectively provide power to any of the elements of storage card 110. Power control module 121 can receive control instructions from processor 120 or over PCIe link 140. In some examples, power control module 121 comprises processing elements discussed above for processor 120, or is included in the elements of processor 120. Power control module 121 can receive power over power link 123 as a power source for the various elements of storage card 110. Holdup circuit 122 includes energy storage devices for storing power received over power link 123 for use during power interruption events, such as loss of source power. Holdup circuit 122 can include capacitance storage devices, such as an array of capacitors. Further discussion of examples of power control circuitry is found below.

In some examples, bidirectional power flow is possible over link 123. Power can be accepted by storage card 110 when input power is available, such as from a mating connector. Power can be redistributed to other storage cards by module 110 over link 123 when input power is not available, such as during power interruption events. When storage card 110 is removed from a mating connector, then power can be bled off into associated power sink circuitry. Although one power link 123 is shown, it should be understood that more than one link can be included, such as separate input and output links or separate links for different voltage levels.

Figure 2:
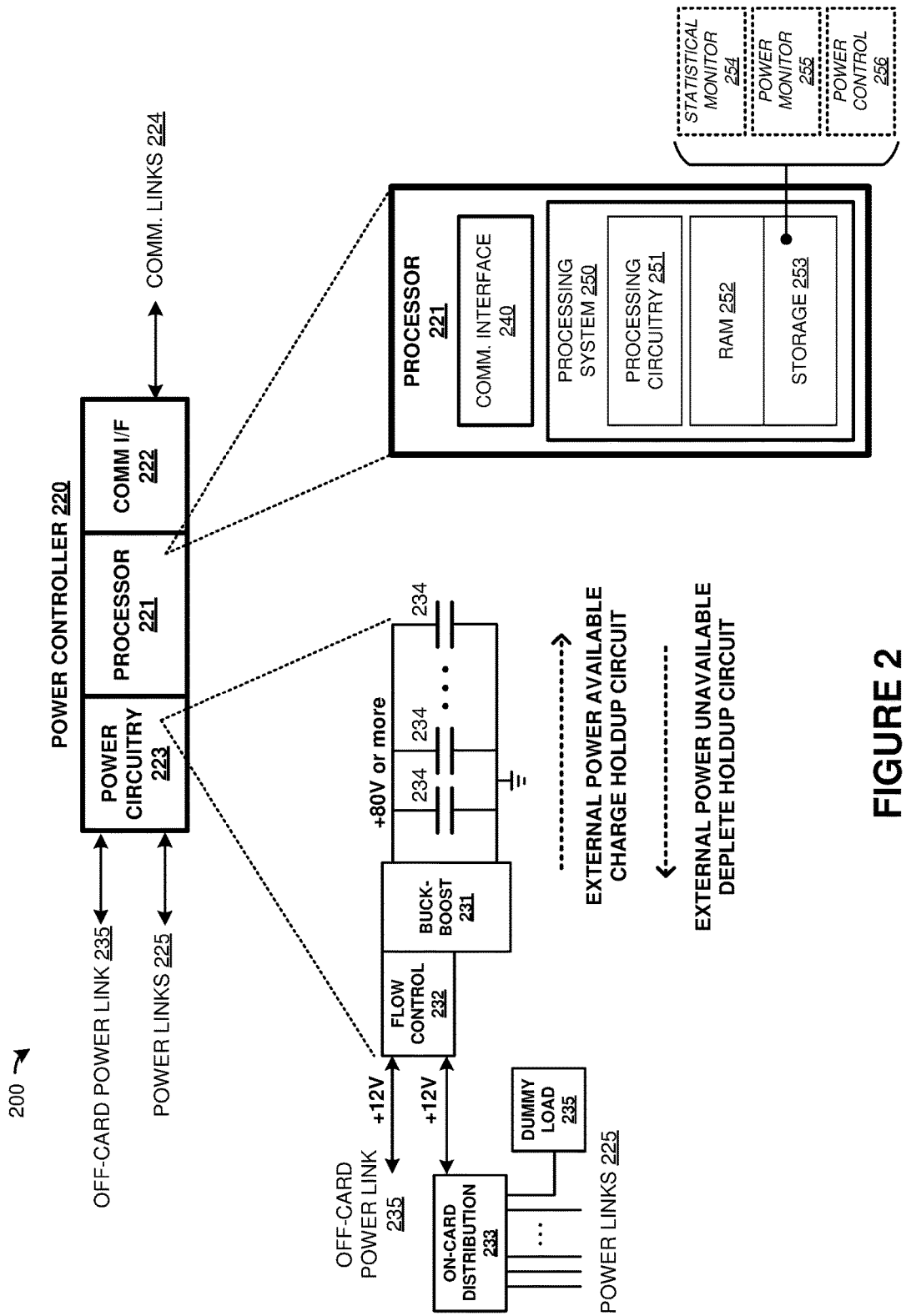
FIG. 2 is a block diagram illustrating a power control system.

FIG. 2 is a block diagram illustrating power control system 200. Power control system 200 can be included on any of the storage cards discussed herein, such as the power controller or holdup circuitry portions of storage card 310 of FIGS. 1A and 1B, among others. Power control system 200 illustrates power controller 220, which can be an example of any of the power control modules or processor discussed herein, such as power control module 121 or processor 120 of FIGS. 1A and 1B. Power controller 220 includes processor 221, communication interface 222, and power circuitry 223. Each of the elements of power controller 220 are communicatively coupled.

Communication interface 222 communicates over communication links 224, which can include any of the communication link protocols and types discussed herein. Communication interface 222 can include transceivers, network interface equipment, bus interface equipment, and the like. In operation, communication interface 222 receives control instructions from another processing unit over communication links 224. Communication links 224 also communicate with elements of the card that power controller 220 is employed on. For example, on a storage card, communication links 224 receive write data commit status of storage drives, power control instructions from other processors or processing systems, and can communicate over a PCIe interface or sideband communications of a PCIe interface.

Processor 221 includes any processor or processing system discussed herein, and controls the operations of power controller 220, such as initiating power up of storage card elements, initiating power down of storage card elements, monitoring usage statistics for a storage card or for other storage cards.

To further describe the circuitry and operation of processor 221, a detailed view is provided, although variations are possible. Processor 221 includes communication interface 240 and processing system 250. Processing system 250 includes processing circuitry 251, random access memory (RAM) 252, and storage 253, although further elements can be included. Example contents of storage 253 are further detailed by software modules 254-256.

Processing circuitry 251 can be implemented within a single processing device but can also be distributed across multiple processing devices or sub-systems that cooperate in executing program instructions. Examples of processing circuitry 251 include general purpose central processing units, microprocessors, application specific processors, and logic devices, as well as any other type of processing device. In some examples, processing circuitry 251 includes physically distributed processing devices, such as cloud computing systems.

Communication interface 240 includes one or more communication and network interfaces for communicating over communication networks or discrete links, such as communication interface 222, or further serial links, packet networks, the Internet, and the like. The communication interfaces can include one or more local or wide area network communication interfaces which can communicate over Ethernet or Internet protocol (IP) links. Communication interface 240 can include network interfaces configured to communicate using one or more network addresses, which can be associated with different network links. Examples of communication interface 240 include network interface card equipment, transceivers, modems, and other communication circuitry. Although communication interface 240 and communication interface 222 are both shown in FIG. 2, it should be understood that these can comprise different interfaces or combined into the same communication interface module, and can communicate over links 224.

RAM 252 and storage 253 together can comprise a non-transitory data storage system, although variations are possible. RAM 252 and storage 253 can each comprise any storage media readable by processing circuitry 251 and capable of storing software. RAM 252 can include volatile and nonvolatile, removable and non-removable media implemented in any method or technology for storage of information, such as computer readable instructions, data structures, program modules, or other data. Storage 253 can include non-volatile storage media, such as solid state storage media, flash memory, phase change memory, or magnetic memory, including combinations thereof. RAM 252 and storage 253 can each be implemented as a single storage device but can also be implemented across multiple storage devices or sub-systems. RAM 252 and storage 253 can each comprise additional elements, such as controllers, capable of communicating with processing circuitry 251.

Software stored on or in RAM 252 or storage 253 can comprise computer program instructions, firmware, or some other form of machine-readable processing instructions having processes that when executed a processing system direct processor 221 to operate as described herein. For example, software drives processor 221 to monitor operating statistics and status for a storage card, monitor power status for the cards and modules, and instruct power circuitry 223 to control flow of holdup power or operational power, among other operations. The software can also include user software applications. The software can be implemented as a single application or as multiple applications. In general, the software can, when loaded into a processing system and executed, transform the processing system from a general-purpose device into a special-purpose device customized as described herein.

Software modules 254-256 each comprise executable instructions which can be executed by processor 221 for operating power controller 220 according to the operations discussed herein. Specifically, statistical monitor 254 monitors usage status or usage statistics for elements of a storage card. The usage statistics include data transfer rates of links, error rates of links, a cumulate number of errors of links, among other statistics. The usage statistics can be collected and stored by processor 221 in a data structure, such as a database or table and stored in storage 253, RAM 252, or other storage elements. Power monitor 255 monitors power inrush statistics during a power-up process, power status statistics, power active status, voltage levels, phase measurements, current draw, holdup circuit status or levels, card/module insertion status, thermal levels, among other statistics. Power control 256 instructs power circuitry to power up or power down an associated storage card or module responsive to statistical monitor 254 or power monitor 255, among other signals such as discrete signals monitored by power circuitry 223. Power control 256 can power up or power down a card or module responsive to data commit status of associated storage drives or other circuitry, responsive to insertion status, or other factors.

Software modules 254-256 can reside in RAM 252 during execution and operation by processor 221, and can reside in storage space 253 during a powered-off state, among other locations and states. Software modules 254-256 can be loaded into RAM 252 during a startup or boot procedure as described for computer operating systems and applications.

Storage 253 can include one or more storage systems comprising flash memory such as NAND flash or NOR flash memory, phase change memory, magnetic memory, among other solid state storage technologies. As shown in FIG. 2, storage 253 includes software modules 254-256 stored therein. As described above, storage 253 can store software modules 254-256 in one or more non-volatile storage spaces during a powered-down state of processor 221, among other operating software, such as operating systems.

Processor 221 is generally intended to represent a computing system where at least software modules 254-256 are deployed and executed in order to render or otherwise implement the operations described herein. However, processor 221 can also represent any computing system on which at least software modules 254-256 can be staged and from where software modules 254-256 can be distributed, transported, downloaded, or otherwise provided to yet another computing system for deployment and execution, or yet additional distribution.

Power circuitry 223 includes various power control, voltage regulation, power holdup, and other circuitry. Power circuitry 223 receives power from a power source, such as off-card power link 235, and distributes power to on-card elements over ones of power links 225.

As a specific example of power circuitry 223, various elements are shown in FIG. 2. These elements include buck-boost module 231, flow control module 232, on-card distribution module 233, holdup capacitors 234, and dummy load 235. Buck-boost module 231 comprises one or more switching power regulators that receive power from a power source, such as off-card power link 235, and boosts a voltage associated with the power source to a holdup voltage for holdup capacitors 234. In this example, the power source is provided at +12 VDC and the holdup capacitors 234 are driven at +80 VDC, although different voltages can be employed, such as 125 VDC or higher voltages on holdup capacitors 234. Buck-boost module 231 can also take the energy stored by holdup capacitors 234 and step-down the voltage to a lower voltage, such as 12 VDC for driving on-card or off-card elements using the energy stored in holdup capacitors 234. Processor 221 can communicate with buck-boost 231 to instruct buck-boost 231 to enter a buck mode or a boost mode. Buck-boost 231 can receive control signals or instructions from processor 221, such as over general purpose I/O of processor 221.

To control the flow of energy between on-card power and holdup power, flow control module 232 is employed. Flow control module 232 includes various power switching elements, such as transistor switches, analog switches, solid state switches, diodes, and the like. When external off-card power is available, such as over link 235, then flow control 232 can provide this power to on-card distribution module 233 and to buck-boost module 231 for charging holdup capacitors 234. When external off-card power is not available, then flow control 232 can allow power stored in holdup capacitors 234 and stepped-down by buck-boost module 231 to flow to on-card distribution module 233 instead of off-card power of link 235. Also, as discussed below, when excess energy remains in holdup capacitors 234 after an associated storage card of power controller 220 has had all elements powered down and data committed, then this excess energy can be directed by flow control module 232 to off-card consumers over link 235. In this manner, excess energy stored in holdup devices of power controller 220 can be used to provide power to other cards or devices during a shutdown or commit process. The commit process includes writing any in-flight write data to non-volatile memory. The non-volatile memory can include storage drives of a storage card, or can include separate non-volatile memory dedicated to power-down caching of in-flight data. If the associated storage card of power controller 220 is instead removed from a chassis or connector, then this excess energy of holdup capacitors 234 can be safely bled off using dummy load 235. Flow control module 232 can receive control signals or instructions from processor 221, such as over general purpose I/O of processor 221.

On-card distribution module 233 includes various power flow and switching circuitry to direct electrical power to various elements of a storage card, such as storage drives, PCIe switches, and the like, over links 225. Links 225 can comprise the various power links discussed herein for the various cards. On-card distribution module 233 includes various power switching elements, such as transistor switches, analog switches, solid state switches, diodes, and the like. On-card distribution module 233 can receive control signals or instructions from processor 221, such as over general purpose I/O of processor 221.

Figure 8:
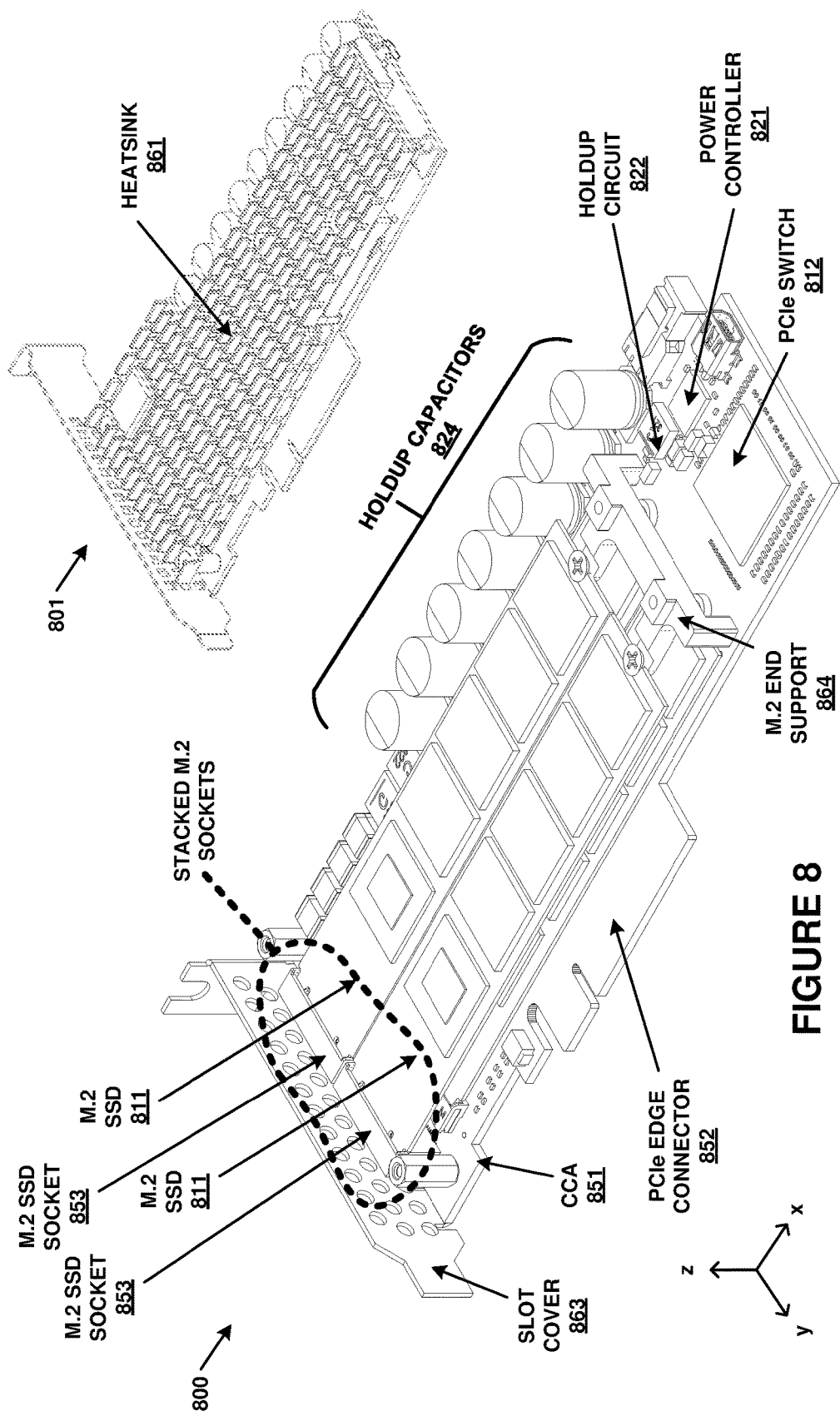
FIG. 8 illustrates a PCIe storage card.
Figure 10:
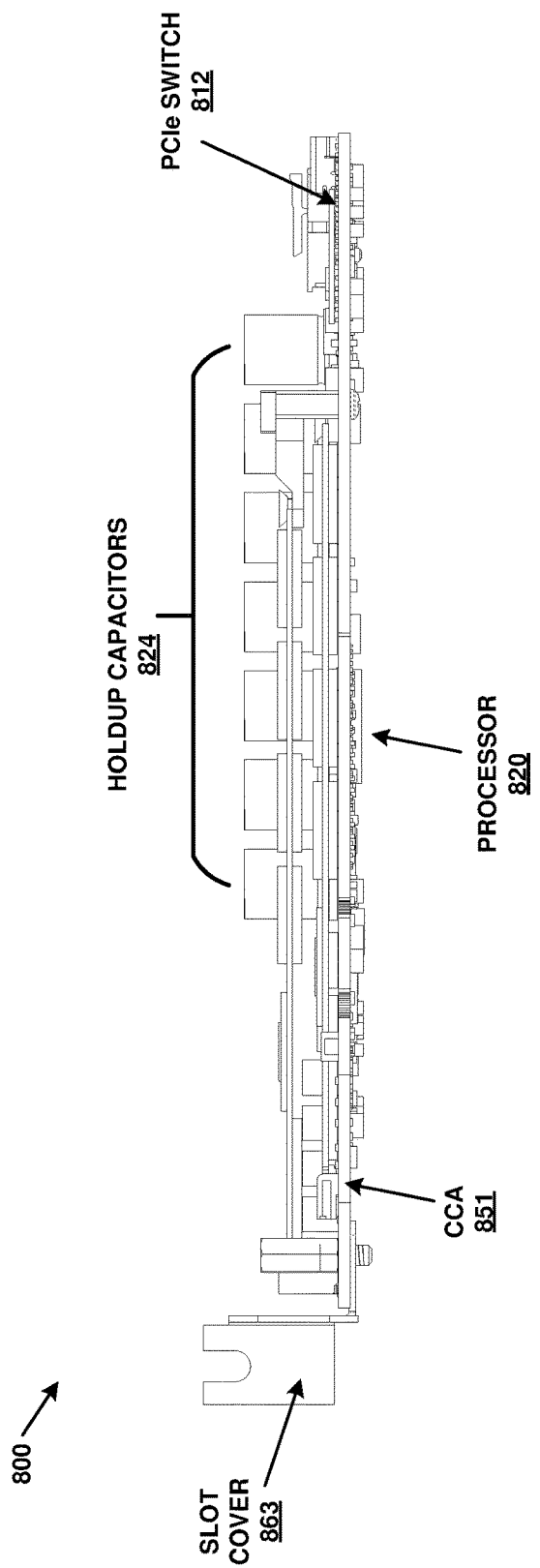
FIG. 10 illustrates a PCIe storage card.

Dummy load 235 can include resistive loads, such as heat dissipating electrical elements to bleed off excess energy of a holdup circuit, such as holdup capacitors 234. In some examples, dummy load 235 comprises a high-output light emitting diode (LED) which can efficiently bleed off excess energy using the light output of the LED. This LED can also indicate that energy still remains in the holdup circuit, warning a user of a particular storage card that potentially dangerous or damaging voltages and energies might still exist on a storage card. When a card is inserted into a connector, the LED is normally off. However, when a storage card is removed from a connector, then the LED would be instructed to illuminate and indicate that energy was being bled off of the storage card using the LED. When the LED finally turned off, due to insufficient energy remaining on a card, then the operator can know that dangerous or damaging voltages and energies no longer exist on the storage card. If the LED cannot bleed all of the energy quickly enough, then additional resistive elements can be employed in parallel to assist the LED indicator. Cover plates for the various higher voltage elements, such as capacitors, of system 200 can be employed, such as illustrated in FIGS. 8 and 10.

Figure 3:
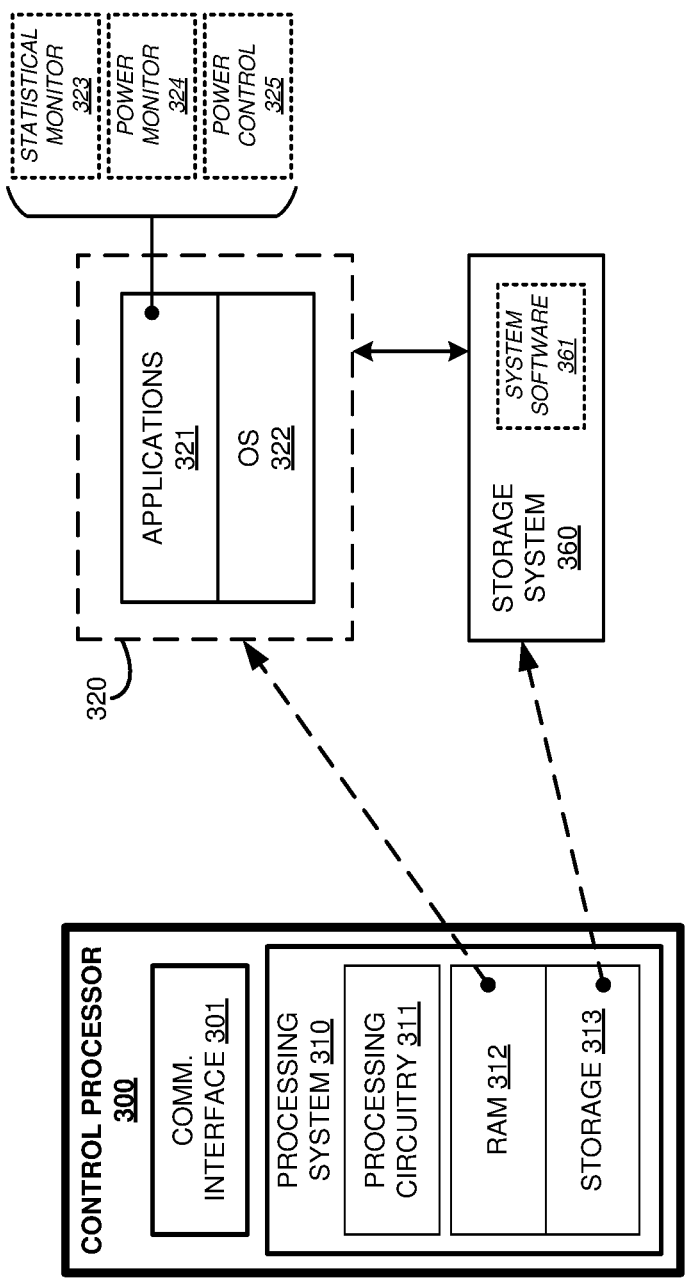
FIG. 3 is s block diagram illustrating a processing system.
Figure 4:
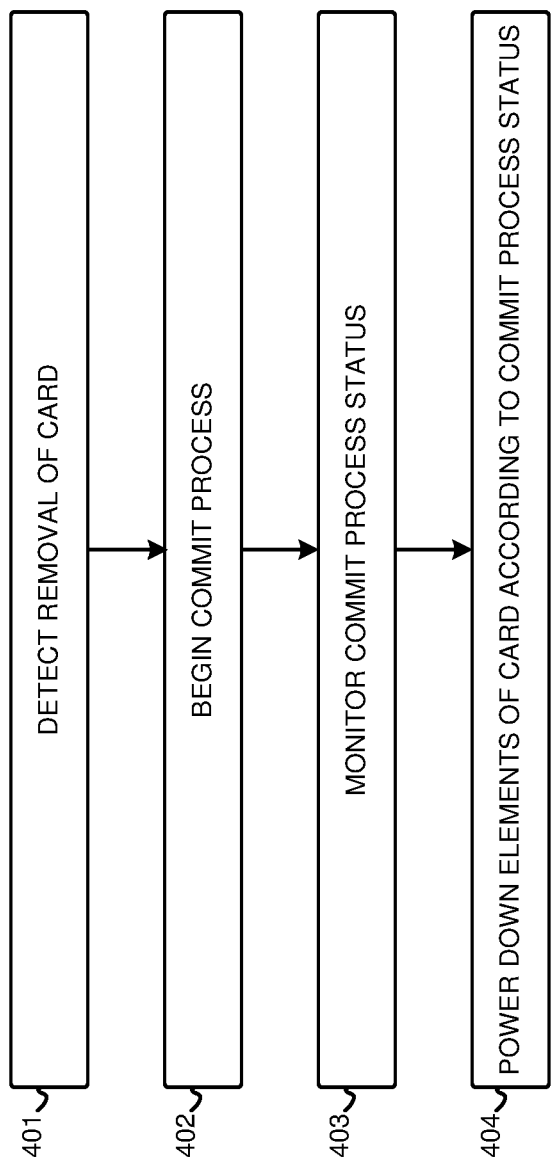
FIG. 4 is s flow diagram illustrating a method of operating a module.
Figure 5:
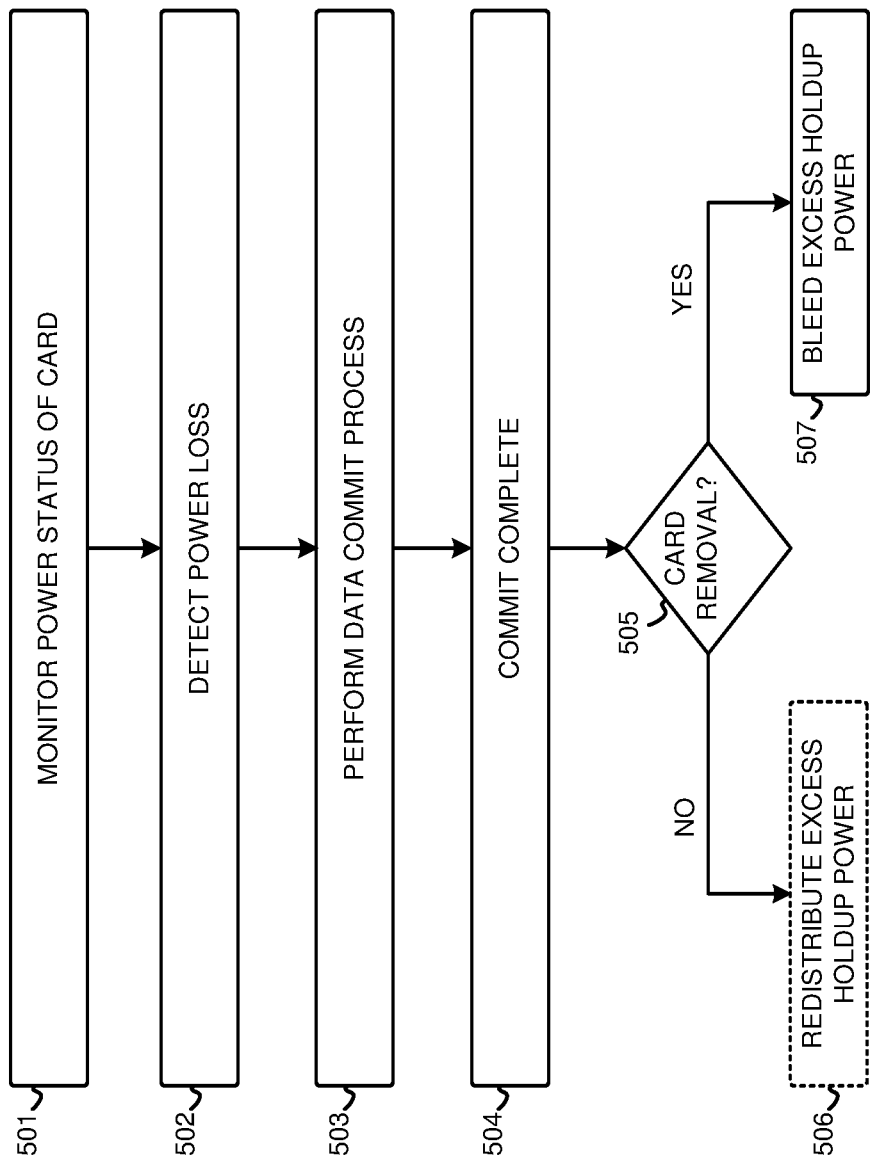
FIG. 5 is s flow diagram illustrating a method of operating a module.
Figure 6:
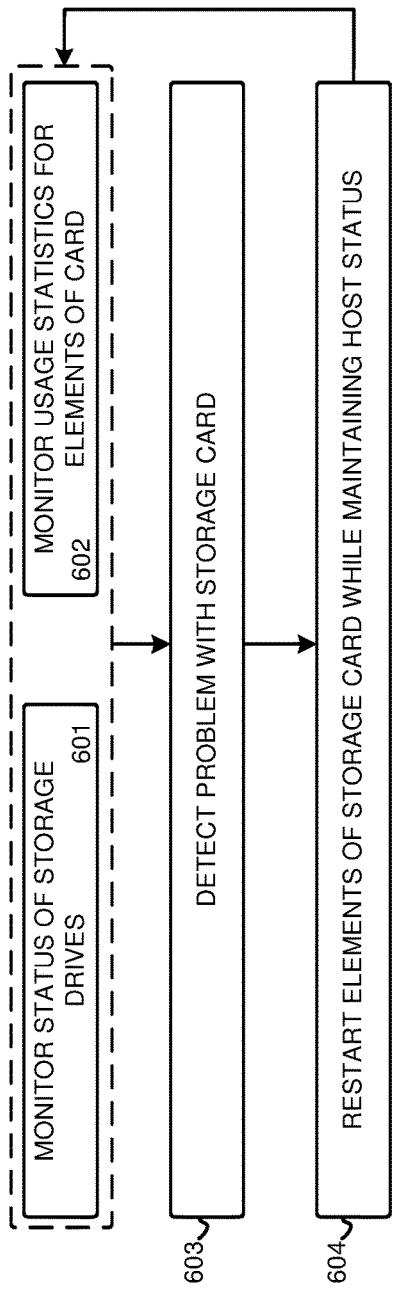
FIG. 6 is s flow diagram illustrating a method of operating a module.

To discuss the various power holdup, distribution, and handling operations of FIG. 2 as well as the various power controllers of the modules herein, FIGS. 3-6 are included. FIG. 3 discusses removal of a module from a connector. FIG. 4 discusses the handling of power loss from a module, including from removal. FIG. 5 discusses powering module elements according to usage statistics. FIG. 6 discusses changing power characteristics according to usage statistics.

FIG. 3 is s block diagram illustrating processing system 300. Processing system 300 illustrates an example of any of the power control modules or card processors discussed herein, such as power control module 121 or processor 120 of FIGS. 1A and 1B, or power controller 220 of FIG. 2. In addition, processing system 300 can be illustrative of any processing system a storage card discussed herein.

Control processor 300 includes communication interface 301 and processing system 310. Processing system 310 includes processing circuitry 311, random access memory (RAM) 312, and storage 313, although further elements can be included. Example contents of RAM 312 are further detailed in RAM space 320, and example contents of storage 313 are further detailed in storage system 360.

Processing circuitry 311 can be implemented within a single processing device but can also be distributed across multiple processing devices or sub-systems that cooperate in executing program instructions. Examples of processing circuitry 311 include general purpose central processing units, microprocessors, application specific processors, and logic devices, as well as any other type of processing device.

In some examples, processing circuitry 311 includes physically distributed processing devices, such as cloud computing systems.

Communication interface 301 includes one or more communication and network interfaces for communicating over communication links, networks, such as packet networks, the Internet, and the like. The communication interfaces can include PCIe interfaces, serial links, such as SPI links, I2C links, USB links, UART links, or one or more local or wide area network communication interfaces which can communicate over Ethernet or Internet protocol (IP) links. Communication interface 301 can include network interfaces configured to communicate using one or more network addresses, which can be associated with different network links. Examples of communication interface 301 include network interface card equipment, transceivers, modems, and other communication circuitry.

RAM 312 and storage 313 together can comprise a non-transitory data storage system, although variations are possible. RAM 312 and storage 313 can each comprise any storage media readable by processing circuitry 311 and capable of storing software. RAM 312 can include volatile and nonvolatile, removable and non-removable media implemented in any method or technology for storage of information, such as computer readable instructions, data structures, program modules, or other data. Storage 313 can include non-volatile storage media, such as solid state storage media, flash memory, phase change memory, or magnetic memory, including combinations thereof. RAM 312 and storage 313 can each be implemented as a single storage device but can also be implemented across multiple storage devices or sub-systems. RAM 312 and storage 313 can each comprise additional elements, such as controllers, capable of communicating with processing circuitry 311.

Software stored on or in RAM 312 or storage 313 can comprise computer program instructions, firmware, or some other form of machine-readable processing instructions having processes that when executed a processing system direct control processor 300 to operate as described herein. For example, software can drive processor 300 to monitor operating statistics and status for various storage cards and other modules, monitor power status for the cards and modules, and instruct power circuitry to control flow of holdup power or operational power, control power down or reset of various on-board storage drives, control performance throttling, among other operations. The software can also include user software applications, application programming interfaces (APIs), or user interfaces. The software can be implemented as a single application or as multiple applications. In general, the software can, when loaded into a processing system and executed, transform the processing system from a general-purpose device into a special-purpose device customized as described herein.

RAM space 320 illustrates a detailed view of an example configuration of RAM 312. It should be understood that different configurations are possible. RAM space 320 includes applications 321 and operating system (OS) 322. Software applications 323-325 each comprise executable instructions which can be executed by processor 300 for operating a power controller or other circuitry according to the operations discussed herein. Specifically, statistical monitor 323 monitors usage status or usage statistics for elements of cards and modules. The usage statistics include data transfer rates of links, error rates of links, a cumulate number of errors of links, among other statistics. The usage statistics can be collected and stored by processor 300 in a data structure, such as a database or table and stored in storage 313, RAM 312, or other storage elements. Power monitor 324 monitors power statistics during a power up, operational, or power-down processes, power status statistics, power active status, voltage levels, phase measurements, current draw, holdup circuit status or levels, card/module insertion status, thermal levels, among other statistics. Power control 325 instructs power circuitry to power up or power down an associated drive, card, circuitry, or module responsive to statistical monitor 323 or power monitor 324, among other signals such as discrete signals monitored by associated power circuitry. Power control 325 can power up or power down a card or module responsive to data commit status of associated storage drives or other circuitry, responsive to insertion status, or other factors.

Applications 321 and OS 322 can reside in RAM space 320 during execution and operation of control processor 300, and can reside in storage system 360 during a powered-off state, among other locations and states. Applications 321 and OS 322 can be loaded into RAM space 320 during a startup or boot procedure as described for computer operating systems and applications.

Storage system 360 illustrates a detailed view of an example configuration of storage 313. Storage system 360 can comprise flash memory such as NAND flash or NOR flash memory, phase change memory, magnetic memory, among other solid state storage technologies. As shown in FIG. 3, storage system 360 includes system software 361. As described above, system software 361 can be in a non-volatile storage space for applications and OS during a powered-down state of control processor 300, among other operating software.

Control processor 300 is generally intended to represent a computing system with which at least software 361 and 321-325 are deployed and executed in order to render or otherwise implement the operations described herein. However, control processor 300 can also represent any computing system on which at least software 361 and 321-325 can be staged and from where software 361 and 321-325 can be distributed, transported, downloaded, or otherwise provided to yet another computing system for deployment and execution, or yet additional distribution.

FIG. 4 is a flow diagram illustrating a method of operating a storage card. The operations of FIG. 4 are discussed below in an exemplary storage card, such as storage card 110 of FIGS. 1A and 1B. It should be understood that the operations of FIG. 4 can apply to any of the cards or modules discussed herein, including storage cards and processing modules, among others. Also, the operations of FIG. 4 are discussed in the context of a local processor or power controller, such as the elements of FIG. 2 or 3. It should be understood that the operations of FIG. 4 can be handled by a different controller, processor, or processing system, such as controller 121 or processor 120 of FIGS. 1A and 1B, including combinations and variations thereof.

In FIG. 4, processor 120 detects (401) removal of card 110. This removal can include card 110 being physically removed from an associated connector, such as connector 152 of FIGS. 1A and 1B. In addition to detecting removal of card 110, processor 120 can also detect power loss for a source power, such as provided over power link 123. Power loss flags or alerts can also be provided over any of sideband link 149 or PCIe link 140. In some examples, power loss of link 123 can be interpreted as a physical removal of card 110. In other examples, various removal detection methods can be employed, such as pull-down or pull-up pins associated with card 110 which can indicate physical mating of card 110 with a socket or connector of an associated connector.

Once removal or power loss is detected, processor 120 begins (402) a commit process for card 110. The commit process ensures that data currently in-flight for storage into any of storage drives 111 is properly written to an associated storage drive 111 or to a temporary non-volatile memory of card 110 during a power hold-up period. Data that has been received over PCIe switch 112 can be written to the associated storage drive 111 without loss of that data.

The commit process can include initially powering down PCIe switch 112 but still providing power to a buffer associated with card 110 which data in-flight is placed before the data is committed to non-volatile memory, such as ones of storage drive 111. The buffers can be included in each storage drive 111, or in separate data buffer components. Processor 120 monitors (403) the commit process for each storage drive 111 and powers down individual ones of storage drives 111 once all write data has been committed to non-volatile storage of storage drive 111.

Thus, processor 120 powers down (404) elements of card 110 according to the commit process status. Namely, PCIe switch 112 is first powered down after power loss is detected, and individual ones of storage drives 111 are powered down as each completes an associated commit process for buffered write data. Once all write data has been committed to non-volatile memory, processor 120 can power further elements such as processor 120 itself or power controller 121.

During the commit and power down process described above, holdup circuit 122 provides power to the individual elements of card 110. Processor 120 communicates with power controller 121, such as over link 130 or another link, and instructs power controller 121 to selectively enable/disable power for the various elements of card 110. Power controller 121 can employ solid state switches, transmission gates, solid state analog switches, transistor switches, or other power switching elements to selectively provide or remove power for the various elements of card 110. Power controller 121 can also provide an input power status to processor 120 to indicate when input power is available.

Once input power is regained, such as by re-insertion of card 110 into a connector or after recovery of a source power, power controller 121 can apply power to processor 120. Processor 120 can proceed through a startup process, such as a boot process, and then instruct power controller 121 to selectively apply power to the other various elements of card 110. These various elements of card 110 can be powered up in a predetermined sequence to reduce inrush current over link 123. The predetermined sequence can include powering on individual ones of storage drives 111 in a sequential manner, then powering on PCIe switch, among other sequences.

FIG. 5 is s flow diagram illustrating a method of operating a storage card. The operations of FIG. 5 are discussed below in an exemplary storage card, such as storage card 110 of FIGS. 1A and 1B. It should be understood that the operations of FIG. 5 can apply to any of the cards or modules discussed herein, including storage cards and processing modules, among others. Also, the operations of FIG. 5 are discussed in the context of a local processor or power controller, such as the elements of FIG. 2 or 3. It should be understood that the operations of FIG. 5 can be handled by a different controller, processor, or processing system, such as controller 121 or processor 120 of FIGS. 1A and 1B, including combinations and variations thereof.

In FIG. 5, processor 120 monitors (501) power status of card 110 and detects (502) power loss of card 110. This power loss can include removal of card 110, such as card 110 being physically removed from an associated connector, such as connector 152 of FIGS. 1A and 1B. In addition to detecting removal of card 110, processor 120 can also detect power loss for a source power, such as provided over power link 123. Power loss flags or alerts can also be provided over any of sideband link 149 or PCIe link 140. In some examples, power loss of link 123 can be interpreted as a physical removal of card 110. In other examples, various removal detection methods can be employed, such as pull-down or pull-up pins associated with card 110 which can indicate physical mating of card 110 with a socket or connector of an associated connector.

Once removal or power loss is detected, processor 120 performs (503) a commit process for card 110. The commit process ensures that data currently in-flight for storage into any of storage drives 111 is properly written to an associated storage drive 111 or to a temporary non-volatile memory of card 110 during a power hold-up period. Data that has been received over PCIe switch 112 can be written to the associated storage drive 111 without loss of that data. The commit process can include initially powering down PCIe switch 112 but still providing power to a buffer associated with card 110 which data in-flight is placed before the data is committed to non-volatile memory, such as ones of storage drive 111. The buffers can be included in each storage drive 111, or in separate data buffer components. Processor 120 monitors the commit process for each storage drive 111 and powers down individual ones of storage drives 111 once all write data has been committed to non-volatile storage of storage drive 111. Thus, processor 120 powers down elements of card 110 according to the commit process status. Namely, PCIe switch 112 is first powered down after power loss is detected, and individual ones of storage drives 111 are powered down as each completes an associated commit process for buffered write data. Once all write data has been committed to non-volatile memory, processor 120 can power further elements such as processor 120 itself or power controller 121.

During the commit and power down process described above, holdup circuit 122 provides power to the individual elements of card 110. Processor 120 communicates with power controller 121, such as over link 130 or another link, and instructs power controller 121 to selectively enable/disable power for the various elements of card 110. Power controller 121 can employ solid state switches, transmission gates, solid state analog switches, transistor switches, or other power switching elements to selectively provide or remove power for the various elements of card 110. Power controller 121 can also provide an input power status to processor 120 to indicate when input power is available.

Once the commit process is complete, processor 120 can operate in at least two different manners depending upon if the card is removed or not (505) to cause the power loss. When the power loss status is not due to card removal, such as due to loss of source power while the card remains seated in an associated connector, then power controller 121 might redistribute (506) excess holdup power. Excess power redistribution can occur in systems that support bidirectional PCIe power flow, or in customized systems with power provided separate from a PCIe interface. This excess holdup power comprises energy remaining in any associated holdup circuit, such as holdup capacitors. A flow control circuit can direct energy from the holdup circuit to a link that feeds power off-card. In some examples, such as in FIG. 2, the holdup circuit comprises an array of capacitors which are charged to a higher voltage than desired for an operating voltage of a card. In this case, a buck-boost converter can be operated in a step-down mode to convert the high voltage of the holdup capacitors to a lower operating voltage, and a power flow control circuit can direct this energy too off-card destinations or power busses. The redirected power can be used by other cards to increase holdup time of the other cards to complete shut down operations or data commit operations. A measurement of remaining energy in the holdup circuit can be monitored by processor 120 and information related to the remaining energy can be provided off-card along with the power itself. In some examples, processor 120 is also powered down and thus only power flow, voltage step down, and holdup portions of power controller 121 are active during the power redistribution.

When the power loss is due to card removal (507), then power controller 121 can bleed excess power of the holdup circuit. As discussed in FIG. 2, this power bleed can include resistive or LED elements, and ensures that dangerous or damaging energy or high voltage is not remaining on a card after removal from a connector.

Once input power is regained, such as by re-insertion of card 110 into a connector or after recovery of a source power, power controller 121 can apply power to processor 120. Processor 120 can proceed through a startup process, such as a boot process, and then instruct power controller 121 to selectively apply power to the other various elements of card 110. These various elements of card 110 can be powered up in a predetermined sequence to reduce inrush current over link 123. The predetermined sequence can include powering on individual ones of storage drives 111 in a sequential manner, then powering on PCIe switch, among other sequences.

FIG. 6 is a flow diagram illustrating a method of operating storage card 110 for in-situ restarting of any of storage drives 111 during operation of storage card 110. The operations of FIG. 6 are discussed below in an exemplary storage card, such as storage card 110 of FIGS. 1A and 1B. It should be understood that the operations of FIG. 6 can apply to any of the cards or modules discussed herein, including storage cards and processing modules, among others. Also, the operations of FIG. 6 are discussed in the context of a local processor or power controller, such as the elements of FIG. 2 or 3. It should be understood that the operations of FIG. 6 can be handled by a different controller, processor, or processing system, such as controller 121 or processor 120 of FIGS. 1A and 1B, including combinations and variations thereof.

In FIG. 6, processor 120 monitors (601) status of all storage drives 110 and also optionally monitors (602) usage status or usage statistics for elements of card 110. These elements include any of storage drives 111, PCIe switch 112, processor 120, power control node 121, holdup circuitry 122, or any of the various links and communication interfaces. The status and usage statistics include data transfer rates of PCIe links, error rates of PCIe links, retry rates, signal qualities, a cumulate number of errors of PCIe links, card insertion status, thermal levels of elements of card 110, among other statistics, including those statistics received from another card or from a host. The status and usage statistics can include inrush statistics provided by power controller 121, such as during a power-up process or storage card 110. The status and usage statistics can include power status statistics monitored by power controller 121, such as a power active status, voltage levels, phase measurements, current draw, holdup circuit status or level, among other statistics. The status and usage statistics can be collected and stored by processor 120 in a storage system associated with processor 120, such as RAM, flash memory, or other storage systems. The status and usage statistics can be employed in power down and power up processes such as discussed above in FIGS. 4-7.

Processor 120 detects (603) problems with any of storage drives 111. These problems can be for any of storage drives 111, and can include lack of response to storage operations or sideband signaling, an error rate above an error threshold, a change in PCIe throughput below a throughput threshold, PCIe retry rates above a threshold level, power loss detected, or other problems. Any of the status or usage statistics can be employed to detect an issue or problem with any of the storage drives.

Responsive to detecting a problem with any of the storage drives, processor 120 restarts (604) elements of storage card 110. Specifically, processor 120 can restart ones of storage drives 111 to attempt to correct or eliminate any problem detected. Additionally, each of storage drives 111 is isolated on an associated PCIe interface from a host PCIe interface by PCIe switch 112. Processor 120 can reset or restart one or more of storage drives 111 and keep any associated host status unchanged regarding instantiation of the storage drives, a host power status of the storage drives, or factors that might be apparent to a host system or peripheral system into which storage card 110 is inserted. Thus, the entirety of storage card 110 does not need to stop normal operation when ones of storage drives 111 are experiencing problems or issues, such as ones of storage drives 111 failing to respond to host storage operations or commands.

To restart an individual storage drive, processor 120 can instruct power controller 121 to cycle power for the associated storage drive. In other examples, a reset command is issued to the affected storage drive. In yet other examples, a PCIe command is issued to the affected storage drive which commands a reset of that particular storage drive. Processor 120 can read and store a state or PCIe status information for the affected storage drive and reconfigure that storage drive with the stored state or PCIe status information once reset. The state or PCIe status information can include an identity of the storage drive, an address of the storage drive, a logical unit or logical drive status of the storage drive, among other status, configurations, and information.

During the restart process, any host system which is communicatively coupled to storage card 110 can be shielded from the restart process so that the host system is not aware of the failure, problem, or associated restart. PCIe switch 112 can provide some measure of isolation of PCIe interfaces 141 from PCIe 140 which is coupled to a host system or peripheral system.

Also, during the restart process, storage card 110 might elect among two or more behaviors when host storage operations are received for the storage drive which is being restarted. In a first example, storage card 110 might just not respond to storage operations received over PCIe interface 140 for the storage drive being restarted. This lack of response can force retries in the host system, which can accumulate and eventually cause an error condition in the host system for that particular storage drive. In a second example, one or more buffer circuits can be included on storage card 110 that can accept storage operations for any of storage drives 111 while a storage drive is being reset or restarted in-situ. This buffer can be included in any of the other storage drives or in separate storage circuitry, such as non-volatile memory device.

If the reset process fails to resolve the problem with the particular storage drive, then that storage drive can be powered down and/or the associated host system can be notified of a failure or problem with the affected storage drive. Remaining storage drives can continue to operate over associated PCIe interface 141 and PCIe interface 140 during the reset/power cycle process for an affected storage drive, and when any particular storage drive fails. Thus, enhanced storage operation can be achieved by having continued operation of storage card 110 during individual storage drive failures, and those individual drive failures can be resolved by storage card 110 itself without host system involvement or interruption by using the process described above.

Figure 7:
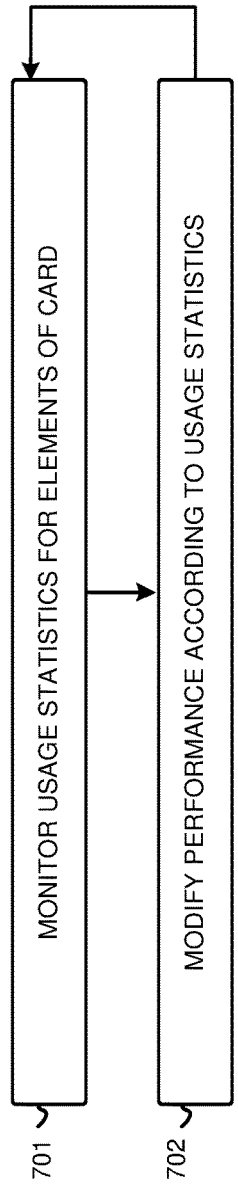
FIG. 7 is s flow diagram illustrating a method of operating a module.

FIG. 7 is s flow diagram illustrating a method of operating a storage card. The operations of FIG. 7 are discussed below in an exemplary storage card, such as storage card 110 of FIGS. 1A and 1B. It should be understood that the operations of FIG. 6 can apply to any of the cards or modules discussed herein, including storage cards and processing modules, among others. Also, the operations of FIG. 7 are discussed in the context of a local processor or power controller, such as the elements of FIG. 2 or 3. It should be understood that the operations of FIG. 7 can be handled by a different controller, processor, or processing system, such as controller 121 or processor 120 of FIGS. 1A and 1B, including combinations and variations thereof.

In FIG. 7, processor 120 monitors (701) usage status or usage statistics for elements of card 110. These elements include any of storage drive 111, PCIe switch 112, processor 120, power control node 121, holdup circuitry 122, or any of the various links and communication interfaces. The usage statistics include data transfer rates of PCIe links, error rates of PCIe links, a cumulative number of errors of PCIe links, card insertion status, thermal levels of elements of card 110, among other statistics, including those statistics received from another card or a host. The usage statistics can include inrush statistics provided by power controller 121, such as during a power-up process or storage card 110. The usage statistics can include power status statistics monitored by power controller 121, such as a power active status, voltage levels, phase measurements, current draw, holdup circuit status or level, among other statistics. The usage statistics can be collected and stored by processor 120 in a storage system associated with processor 120, such as RAM, flash memory, or other storage systems.

Processor 120 modifies (702) performance of elements of storage card 110 according to at least the usage statistics. For example, the usage statistics can also be used to control power usage during normal operation of card 110. When usage statistics indicate that a particular storage drive 111 is dormant or is handling a quantity of transactions that fall below a transaction threshold level, then that storage drive can have an associated operational property modified. This property can include reducing a speed or interface property of a PCIe interface. Processor 120 can disable a subset of the PCIe lanes of a particular storage drive 111 to reduce power consumption of that storage card, such as by reducing the number of active lanes from ×4 to ×1. Processor 120 can reduce a bus speed or clock speed of a PCIe interface of storage drive 111, such as by reducing a throughput from 8 GB/s to 4 GB/s or 1 GB/s. Other performance scaling can occur based on the usage of elements of card 110 as monitored by processor 120. A host status, such as that discussed in FIG. 6, can be maintained during the modification of performance of elements of storage card 110 to prevent action and awareness of fluctuations in storage card performance due to statistically-driven modifications.

Thermal sensors, on-die or on-chip temperature sensors, or discrete thermal measurement circuitry can be employed to monitor thermal status of the elements of storage card 110. The performance of ones of storage drives 111 can be increased or decreased on-the-fly according to thermal levels and PCIe switch 112 can provide a level of abstraction of storage drives 111 from host PCIe interface 140. In this manner, a PCIe speed, width, or lane allocation can be altered for any of storage drives 111 without host system involvement or in-situ by processor 120.

These usage and performance statistics can be provided to a processing module or host for further collection, storage, and processing. Furthermore, instructions for power up/down and performance scaling can be received from a processing module or host based at least on these provided statistics, among other operations.

Additionally, the usage statistics can be employed to selectively power down elements of a particular card, such as powering down storage drives 111 when dormant or when activity levels drop below threshold levels according to the usage statistics. Many components or storage drives incorporate low power modes, such as idle modes. These idle modes can be enabled according to the usage statistics. However, even when in idle or low power modes, these storage drives still consume power. Processor 120 can monitor when these storage drives, or other card elements, fall below a threshold activity level even if in the idle mode, and instruct power control node 121 to remove power from the associated card elements. In some examples, when all storage drives 111 of a storage card are powered down due to usage statistics for the storage drives falling below a threshold usage level, then any associated PCIe switch on the storage card can also be powered down. Power up of the PCIe switch can occur when usage statistics rise above a threshold usage level, which can be a different usage level than the power down threshold.

In further examples, power control node 121 can include various power supply electronics, such as power regulators, step up converters, step down converters, buck-boost converters, power factor correction circuits, among other power electronics. Typically, these power electronics must be tuned ahead of time for a particular load application, such as a maximum load anticipated for a particular card. Various magnetic, solid state, and other electronic components are typically sized according to the maximum power draw for a particular application, and these components are permanently affixed to an associated circuit board, such as by soldering or sockets. In FIG. 7, the usage statistics are monitored to establish a present power draw for the various power electronics, such as a current supplied at a certain voltage by a buck-boost converter.

The various parameters of the power electronics can be altered according to the present power loading, such as by selecting among various magnetic components, such as inductors or transformers, adjusting resistive or capacitive components according to the present power loading, and the like. The alterations or adjustments can enable or disable various electronic components, such as using analog switches, low 'on' resistance transistor switches, or other selection methods. The alterations or adjustments can allow for power control node 121 to operate in a desired efficiency range, such as 90-98% efficiency. As the power load changes due to different usage of the various components of a card, the pre-selected electrical components might lead to a lower efficiency. Based on these current usage statistics or power loading, processor 120 can instruct power control node 121 to alter component selections, modulation frequencies, pulse-width modulation factors, resistive/capacitive/inductive component usage, among other elements to maintain efficiency of a particular power electronic circuit in the desired efficiency range. These alterations or adjustments can bring phase margins or gain margins of the associated power electronics into the desired ranges. The phase and gain can be monitored by elements of power control node 121 or processor 120, including associated circuit elements, such as current sense resistors.

In some examples, the usage statistics, among other factors, are used to modify operating parameters of associated card power electronics. However, these modifications might be used only when power loss is detected, to maximize efficient use of holdup circuitry. For example, if holdup capacitors are employed, the voltage provided by the holdup capacitors can drop as energy is drained from the holdup capacitors. As the voltage drops, the efficiency of a buck-boost converter might be reduced as well, since the input voltage provided by the holdup capacitors might fall below a threshold voltage level for efficient use of analog components related to the buck-boost converter. This holdup voltage can be monitored or be used as an input to an efficiency maximization circuit, which alters parameters or components associated with the buck-boost converter to ensure a desired or predetermined efficiency range or level is maintained. Once the voltage drops below a threshold operational level, the buck-boost converter can be disabled to prevent operating within an undesirably low voltage range, such as dictated by input voltage requirements of the particular power electronic components employed.

FIG. 8 is an exploded view of a HHHL (half-height half-length) PCIe interface card 800. Other card sizes can be employed, such as a FHHL (full-height half-length) or FHFL (full-height full-length), or HHFL (half-height full length), among others. Elements of card 800 can correspond to similar elements of FIGS. 1-3, although variations are possible. PCIe edge connector 852 is insertable into a mating PCIe socket of a host system, such as a motherboard or daughterboard of a computer or server system.

Card 800 incorporates four M.2 SSDs 811 which are inserted into associated M.2 SSD sockets 853. These four M.2 sockets form a stacked or tiered arrangement, with two on a bottom tier and two on an upper tier. The upper tier can employ taller M.2 sockets or elevated M.2 sockets as compared to the lower tier. The lower M.2 SSDs are positioned underneath the upper two M.2 SSDs. The four M.2 SSDs 811 form a compact stacked arrangement which can fit into a single-width PCIe slot, and onto a HHHL sized PCIe card. In this example, the M.2 SSDs comprise either 110 millimeter (mm) or 80 mm sized M.2 SSDs.

Stacked M.2 end support 864 holds and structurally supports an end of each M.2 SSD which is opposite of the connector end. M.2 end support 864 is shown positioned at a 110 mm length to support the four associated ends of four stacked 110 mm length M.2 SSDs, where the SSDs are arrayed the stacked configuration. Card 800 also includes alternate M.2 end mounts 865 which can have M.2 end support 864 positioned therein to support ends of 80 mm M.2 SSDs when M.2 end support 864 is repositioned into alternate M.2 end mounts 865. Other sizes of M.2 SSDs can be included, such as lengths of 16, 26, 30, 38, 42, 60, 80 and 110 mm and widths of 12, 16, 22 and 30 mm Stacked M.2 end support 864 can be formed from a single piece of material or include several pieces, and may include fastener mating members, such as threaded holes for screws or other fasteners.

Also shown in FIG. 8 is cover plate 860 which covers some of the electrical components of card 800. In some examples, cover plate 860 prevents user access to terminals of capacitors 824 to prevent a user from touching higher voltage conductor portions. Cover plate 860 can comprise any metallic or conductive material, including composite materials. Holdup capacitors 824 can comprise an array of capacitors, such as capacitors 234 in FIG. 2. In this example, holdup capacitors 824 are surface-mount electrolytic capacitors, and a circuit board of CCA 851 does not have vias or electrical contacts which carry high-voltage signals on the side opposite to which capacitors 824 are mounted. Thus, when cover plate 860 is fastened to CCA 851, a user is prevented from contacting any high voltages.

Heatsink 861 can be included in card 800 to provide heat dissipation for components of card 800, such as shown in view 801 in FIG. 8. For example, heatsink 861 can be included in a thermal "sandwich" of aluminum plates, thermal epoxy, and/or thermal tape to conduct heat from M.2 devices or other components of card 800 to the PCB/CCA. Heatsink 861 can comprise a machined or cast heatsink that covers the top of card 800. In further examples, one or more fans are included to provide airflow over PCIe switch 812 and M.2 SSDs 811, among other components of card 800. Fans can comprise one or more of any fan type, such as axial-flow, centrifugal and cross-flow, or other fan types, including louvers, fins, or other directional elements, including combinations and variations thereof.

Figure 9:
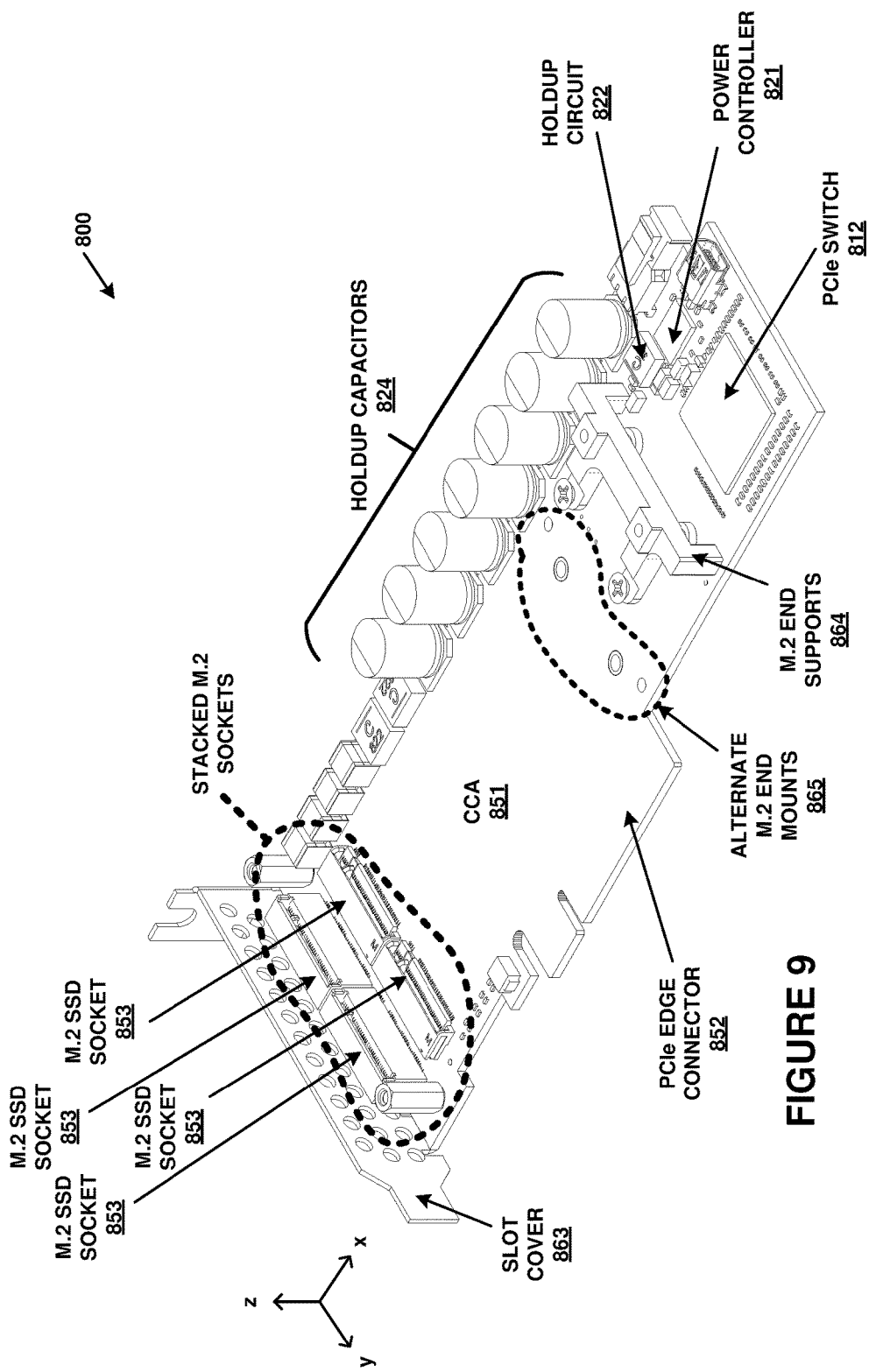
FIG. 9 illustrates a PCIe storage card.

FIG. 9 is a further view of a PCIe interface card 800, with no SSD elements mated with associated M.2 connectors. FIG. 9 illustrates the stacked M.2 sockets in detail, and shows how a lower layer and upper layer form a low-profile, tiered, stacked arrangement to carry four M.2 SSDs. All four M.2 connectors of FIG. 9 are coupled to the same circuit card. The stacked arrangement of M.2 connectors in the axis is illustrated in FIG. 9. Stacked M.2 end support 864 can also be more clearly seen in FIG. 9. Stacked M.2 end support 864 structurally supports an end of each M.2 SSD when mated into an associated M.2 connector.

FIG. 10 is a side view of a PCIe interface card 800. In FIG. 10, processor 820 can be seen on a side of CCA 851 opposite of other components, such as capacitors 824 and PCIe switch 812. PCIe switch 812 can be arranged onto CCA 851 close to PCIe edge connector 852 to reduce signal trace lengths and increase signal integrity for associated PCIe signaling.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A storage card insertable into a Peripheral Component Interconnect Express (PCIe) connector of a host system, comprising:
   a circuit board;
   a plurality of M.2 device connectors coupled to the circuit board, wherein a device connector height of a first set of the M.2 device connectors comprises a height in a vertical axis perpendicular to the surface of the circuit board greater than a device connector height of a second set of the M.2 device connectors; and
   a PCIe switch circuit configured to communicatively couple the plurality of M.2 device connectors and a connector of the storage card, wherein the PCIe switch circuit is configured to receive storage operations over the connector of the storage card and transfer the storage operations for delivery to ones of the plurality of M.2 device connectors over associated interfaces.

2. The storage card of claim 1, wherein the plurality of M.2 device connectors are each configured to mate with associated M.2 devices, wherein the associated M.2 devices each comprise a solid state data storage drive having an associated PCIe interface and solid state storage media, and wherein the solid state data storage drives, when mated, are configured to store and retrieve data responsive to the storage operations received from the PCIe switch circuit over the associated PCIe interfaces.

3. The storage card of claim 1, wherein the storage card comprises a half-height, half-length (HHHL) PCIe expansion card insertable into a PCIe socket comprising the connector of a host system via the connector of the storage card.

4. The storage card of claim 3, wherein the plurality of M.2 device connectors are each configured to mate with associated M.2 devices each comprising a solid state data storage drive having an associated PCIe interface and solid state storage media, and wherein the plurality of M.2 device connectors have device connector slots aligned to mount storage devices along an axis parallel to the circuit board.

5. The storage card of claim 3, wherein the plurality of M.2 device connectors comprises at least four M.2 device connectors, with at least a first two of the four M.2 device connectors comprising a first rank positioned along the surface of the circuit board and at least a second two of the four M.2 device connectors comprising a second rank positioned along the surface of the circuit board, wherein device connector heights of at least the first two of the four M.2 device connectors comprise the height in the vertical axis greater than device connector heights of at least the second two of the at least four M.2 device connectors.

6. The storage card of claim 1, comprising:
   a plurality of M.2 devices each comprising a solid state data storage drive populated into associated ones of the plurality of M.2 device connectors, wherein at least a first of the M.2 devices is stacked above at least a second of the M.2 devices in the vertical axis due at least in part from different device connector heights among corresponding M.2 device connectors.

7. The storage card of claim 1, comprising:
   holdup circuitry configured to provide power to associated M.2 devices plugged into the plurality of M.2 device connectors after input power is lost to the storage card.

8. The storage card of claim 7, comprising:
   the holdup circuitry configured to detect removal of the storage card from the connector of the host system and commit in-flight data directed to ones of the associated M.2 devices plugged into the plurality of M.2 device connectors.

9. The storage card of claim 1, comprising:
   at least one auxiliary connector configured to carry PCIe signaling associated with the PCIe switch circuit to couple the storage card to at least one further storage card over a PCIe interface.

10. The storage card of claim 1, comprising:
end support members configured to structurally support ends of M.2 devices opposite from the plurality of M.2 device connectors when the M.2 devices are populated into the plurality of M.2 device connectors.

11. A peripheral storage card, comprising:
a circuit board;
a plurality of M.2 connectors;
a first set of two or more of the plurality of M.2 connectors comprising a first connector rank having a shorter device connector height in a vertical axis perpendicular to a surface of the circuit board than a second set of two or more of the plurality of M.2 connectors comprising a second connector rank, with each of the plurality of M.2 connectors configured to mate with solid state drive (SSD) devices having associated Peripheral Component Interconnect Express (PCIe) interfaces;
a PCIe switch circuit configured to receive storage operations from a host system over a connector of the peripheral storage card and transfer the storage operations for delivery to selected SSD devices mated with the plurality of M.2 connectors over the associated PCIe interfaces.

12. The peripheral storage card of claim 11, wherein the plurality of M.2 device connectors have device connector slots aligned to mount the SSD devices along an axis parallel to the circuit board.

13. The peripheral storage card of claim 11, comprising:
the SSD devices mated with associated ones of the plurality of M.2 connectors and configured to store and retrieve data responsive to the storage operations received from the PCIe switch circuit over the associated PCIe interfaces, wherein at least a first of the SSD devices is stacked above at least a second of the SSD devices in the vertical axis due at least in part from different device connector heights among corresponding M.2 connectors.

14. The peripheral storage card of claim 11, wherein the peripheral storage card comprises a half-height, half-length (HHHL) PCIe expansion card insertable into a PCIe socket of the host system via the connector of the peripheral storage card.

15. The peripheral storage card of claim 11, comprising:
holdup circuitry configured to provide power to the SSD devices mated with associated ones of the plurality of M.2 connectors after input power is lost to the peripheral storage card.

16. The peripheral storage card of claim 15, comprising:
the holdup circuitry configured to detect removal of the peripheral storage card from a connector of the host system and commit in-flight data directed to ones of the SSD devices mated with associated ones of the plurality of M.2 connectors.

17. The peripheral storage card of claim 11, comprising:
at least one auxiliary connector configured to carry PCIe signaling associated with the PCIe switch circuit to couple the peripheral storage card to at least one further peripheral storage card over a PCIe interface.

18. The peripheral storage card of claim 11, comprising:
stacked end support members configured to structurally support ends of the SSD devices opposite from the plurality of M.2 connectors in the first connector rank and the second connector rank when mated with associated ones of the M.2 connectors.

19. A half-height, half-length (HHHL) Peripheral Component Interconnect Express (PCIe) storage card insertable into a connector of a host system, comprising:
a circuit board;
at least four M.2 storage devices comprising at least two upper M.2 storage devices having a first distance with respect to a surface of the circuit board and stacked above at least two lower M.2 storage devices having a second distance with respect to the surface of the circuit board, each of the at least four M.2 storage devices comprising a PCIe interface and solid state storage media, and configured to store and retrieve data responsive to storage operations received over the associated PCIe interface;
a PCIe switch circuit communicatively coupled to the PCIe interfaces of the four M.2 storage devices and configured to receive the storage operations issued by the host system over a PCIe connector of the PCIe storage card and transfer the storage operations for delivery to ones of the four M.2 storage devices over associated PCIe interfaces; and
holdup circuitry configured to provide power to at least the four M.2 storage devices after input power is lost to the PCIe storage card.

20. The PCIe storage card of claim 19, comprising:
a first set of M.2 connectors coupled to the at least two upper M.2 storage devices;
a second set of M.2 connectors coupled to the at least two lower M.2 storage devices;
wherein the first set has a greater device connector height in a vertical axis perpendicular to the surface of the circuit board than the second set, and
wherein the at least four M.2 device connectors have device connector slots aligned to mount associated M.2 storage devices along an axis parallel to the circuit board.

* * * * *